United States Patent [19]

Fraioli

[11] 3,903,574
[45] Sept. 9, 1975

[54] CABLE CLAMP

[75] Inventor: Donato M. Fraioli, Mamaroneck, N.Y.

[73] Assignee: Air-Tech Industries, Inc., Clifton, N.J.

[22] Filed: June 19, 1974

[21] Appl. No.: 480,831

[52] U.S. Cl. ............................ 24/243 CR; 403/399
[51] Int. Cl.² ...................... A44B 21/00; B25G 3/36
[58] Field of Search ........ 24/81 CR, 243 CR, 243 S, 24/243 SC, 243 AC, 243 R, 115 A, 115 R, 129 B; 403/397, 399, 400; 256/DIG. 3, 48, 54; 339/260, 276 S; 52/719; 24/115 A, 115 R, 129 B

[56] References Cited
UNITED STATES PATENTS

| 575,234 | 1/1897 | Hagaman et al. | 403/399 |
| 762,411 | 6/1904 | Hollingsworth | 403/397 |
| 1,054,803 | 3/1913 | Stiver | 256/54 UX |
| 1,086,732 | 2/1914 | Schoenthaler | 52/719 |
| 2,930,113 | 3/1960 | Greco | 24/115 A X |
| 3,466,712 | 9/1969 | Behney | 24/115 A X |
| 3,564,669 | 2/1971 | Henry | 24/115 R X |

FOREIGN PATENTS OR APPLICATIONS

| 143,336 | 1/1931 | Switzerland | 24/115 A |

*Primary Examiner*—Donald A. Griffin
*Attorney, Agent, or Firm*—Gerald Durstewitz

[57] ABSTRACT

A one-piece cable clamp comprising a body of malleable metal having a cross-sectional shape defined by upper and lower semicircular portions joined on one side by a reverse curved portion and having spaced free ends at the other side. The body is centrally notched along a cross-sectional plane to divide the upper, reverse curve, and a portion of the lower portions into spaced hook sections. One cable is positioned in the base of the notch and the other, at right angles thereto, within the upper semicircular portion. The upper and lower surfaces are pressed together to clamp the cables together.

10 Claims, 6 Drawing Figures

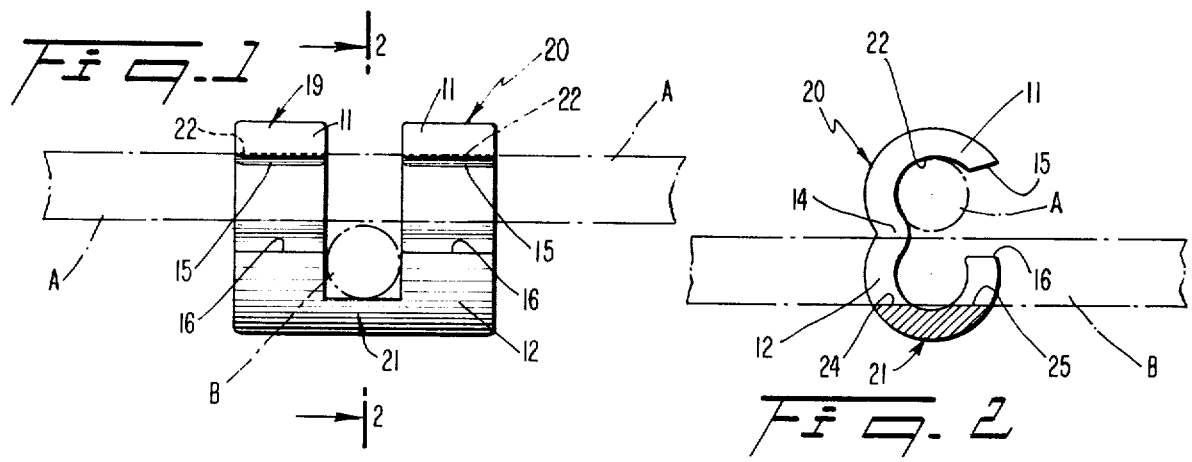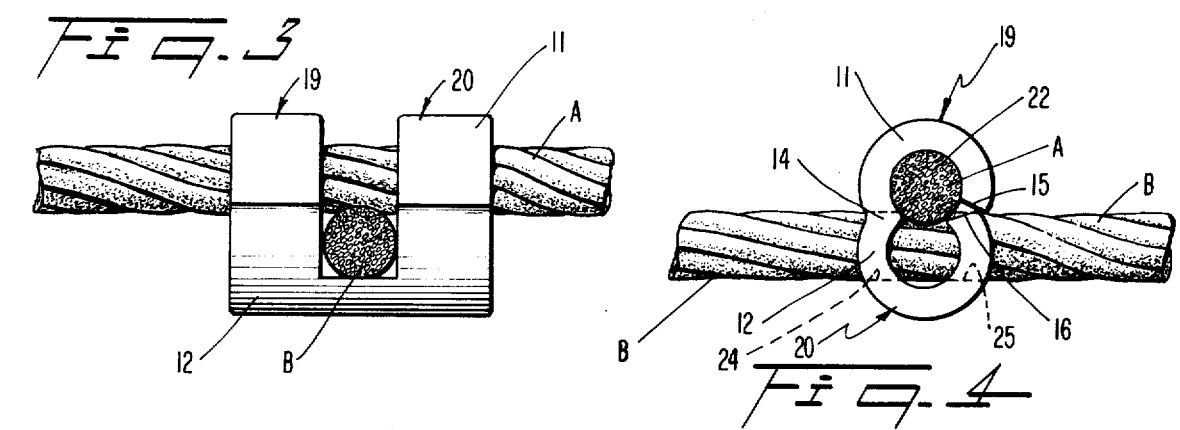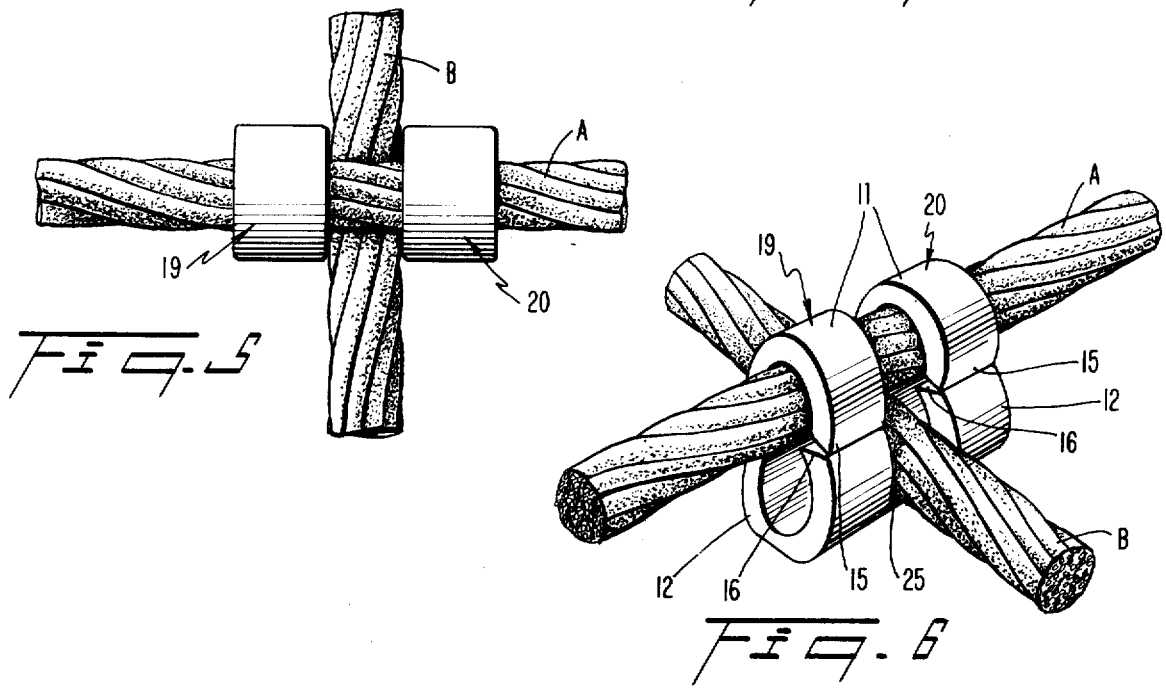

CABLE CLAMP

BACKGROUND OF THE INVENTION

The present invention relates to cable clamps and more particularly to clamps for joining cables which intersect at an angle.

Cable clamps are used extensively in modern reinforced inflatable buildings. In this type of inflatable building a fabric shell is anchored and sealed to the ground around its periphery and the enclosed volume is filled with air having a pressure greater than atmospheric. The shell is lifted by the internal pressure and takes a dome-like configuration above the ground. The action of the air pressure on the fabric skin produces a tensile stress therein which is directly proportional to the radius of the curve of the skin.

It has become common practice to relieve the tension in the fabric skin by positioning a network of intersecting steel cables over the shell and anchoring the ends of the cables to ground anchors. The air pressure acting on a section of fabric bounded by cables causes the fabric to balloon out to form an arc of small radius so that the fabric is lightly loaded.

A recent cable network design disclosed in U.S. Pat. application Ser. No. 511,231, a continuation of Ser. No. 376,137, assigned to the assignee of the present invention, employs cables lying along two sets of parallel cable lines which intersect at right angles. At each intersection point, the two cables are locked together by a cable clamp. These cable clamps must withstand great forces developed when the building is subjected to windloading which would twist and deform the shell except for the action of the cable network. The failure of clamps would allow the cables to shift, leaving large areas of the fabric unsupported and subject to greatly increased tensions.

The cable clamps previously available which will fulfill the loading requirements of such structures have been very expensive to manufacture. Prior art clamps include plates which are bolted together with the cables therebetween, or a combination of one or more plates and U bolts. In addition to being expensive to manufacture, these clamps are expensive to install since they must be assembled in place and then several nut and bolt combinations must be tightened. Also in some designs, exposed bolt heads or bolt ends present a hazard to the fabric.

SUMMARY OF THE INVENTION

It is an object of the present invention to provide a simple, inexpensive, and effective clamp for joining intersecting cables.

Another object is to provide such a clamp which can be rapidly installed.

Another object is to provide such a clamp which is made of malleable metal and is tightened by squeezing the parts together to deform the clamps.

The foregoing objects are accomplished by providing a one-piece clamp for rigidly clamping together first and second cables which cross each other at an angle comprising upper and lower cable contacting sections engaging the outer surfaces of the cables, the upper and lower sections being interconnected, the one-piece clamp being made of malleable metal to deform upon squeezing the elements toward each other to press the cables together and lock them against relative movement.

BRIEF DESCRIPTION OF THE DRAWINGS

A preferred embodiment of the invention has been chosen for purposes of illustration and description, and is shown in the accompanying drawings, forming a part of the specification, wherein:

FIG. 1 is a side view of a cable clamp in accordance with the present invention illustrated in its open or uncrimped condition;

FIG. 2 is a sectional view taken along the line 2—2 in FIG. 1;

FIg. 3 is a side view of the clamp installed upon a pair of cables intersecting at right angles and crimped to lock the cables together;

FIG. 4 is an end view of the clamp shown in FIG. 3;

FIG. 5 is a top view of the clamp shown in FIGS. 3 and 4; and

FIG. 6 is an isometric view of the clamp in the closed or crimped condition locking two cables together.

DESCRIPTION OF THE PREFERRED EMBODIMENT

Referring to the drawings in detail, there is shown in FIGS. 1 and 2 a cable clamp 10 according to the present invention in its open condition for accepting a pair of cables A and B crossed at right angles and indicated in phantom outlines.

The clamp 10 comprises a body of malleable metal (for example, a malleable aluminum) having a cross-sectional shape, as shown in FIG. 2, which is defined by an upper semicircular tubular portion 11 and a lower semicircular tubular portion 12 which are joined on one side by a reverse curved portion 14. The free ends 15 and 16 of the portions 11 and 12 are spaced from each other to provide an opening to allow the cable A to be inserted into the clamp from the side.

As shown in FIG. 1, the body is formed with a notch 17 which extends through the portions 11 and 14 and into the portion 12. The notch 17 divides the body into a pair of hook sections 19 and 20 extending from a base section 21 of the portion 12.

Each of the hook sections 19 and 20 has an interior surface 22 for engaging the surface of cable A which faces away from the cable B. As seen in FIG. 1, the surfaces 22 of the hook sections 19 and 20 engage the cable A on either side of the centerline of the cable B. As seen in FIG. 2, the notch 17 is formed to provide two spaced surfaces 24 and 25 upon the base section 21 which are spaced to engage the cable B on either side of the centerline of the cable A.

The cables may be made of any material, however, in the construction of reinforced inflatable buildings plastic-coated steel cables are most commonly used and this invention is particularly directed to the clamping of such cables.

In the assembly of a cable network for an inflatable building, a number of cables are laid out over a pattern along sets of parallel cable lines. The crossing or intersecting cables are cut to length and positioned along the desired lines before the clamps are positioned at the cable intersecting points. When the cables are properly positioned, the clamp is slipped on the cable B so that the cable B is seated at the base of the slot 17. The clamp is positioned on the cable B adjacent to an intersection point with the open side of the clamp (the opening being defined by the space between the ends 15 and 16) facing the cable A. The clamp is then slid along the cable B toward the cable A until the cable A passes through the opening in the side of the clamp and is positioned within the tubular portion 11 (as indicated in FIG. 2). The tubular portion 11 is formed so that the end 15 is spaced a sufficient distance from the surface of the cable B to allow the cable A to pass.

When the clamp has thus been positioned, the upper surfaces of the hook sections 19 and 20 and the lower surface of the base section 21 are pressed toward each other by a pliers or like tool to deform the clamp as shown in FIGS. 3 and 4 and force the cables A and B together.

The hook sections 19 and 20 press the cable A downwardly on each side of the centerline of the cable B and thereby tend to bend the cable A downwardly on each side of the cable B. In like manner, the surfaces 24 and 25 of the base section 21 press the cable B upwardly on each side of the centerline of the cable A and thereby tend to bend the cable B upwardly on each side of the cable A. These slight bends in the cables provide an extra locking action between the cables, particularly when used with relatively stiff cables; for example steel cables. All outer edges of the clamp are rounded to prevent injury to the fabric shell which the cable network reinforces.

It will be appreciated that the shape of the clamp, particularly its cross-sectional shape, may be varied without departing from the scope of the invention.

It will be seen that the present invention provides a simple, inexpensive and effective cable clamp which can be rapidly and easily installed.

It is to be understood that while this invention is particularly intended for use on the cable networks of inflatable buildings, it is not limited to such use and may be employed to interconnect cables for other purposes.

I claim:

1. A one piece clamp for rigidly clamping together upper and lower flexible cables which cross each other comprising an elongated relatively thickwalled tube-like body of malleable metal having in side view a generally U-shaped configuration defined by a base section and upright sections, said upright sections being spaced apart to receive the lower cable therebetween, said body having in its open condition a shape in end view defined by an upper hooked portion having a free edge, a lower hooked portion having a free edge, and a portion joining said upper and lower portions on the sides thereof opposite to said free edges, said free edges being spaced from each other, said base section comprising the lowest part of said lower portion and having a vertical dimension greater than the wall thickness of said lower portion to provide two spaced surfaces for contacting the lower cable on each side of the vertical centerline of the clamp, the vertical dimension of the clamp in its open condition being only slightly greater than the sum of the diameters of the cables and the wall thickness of said upper and lower portions, said free edges being spaced sufficiently to allow the upper cable to enter the clamp with the lower cable in place, said clamp being dimensioned with respect to the cable diameters so that upon deforming the clamp by squeezing the upper and lower portions toward each other, the cables are forced together whereby the upper cable tends to bend downwardly on each side of the lower cable by contact with said upper portions and the lower cable tends to bend upwardly on each side of the upper cable by contact with said spaced surfaces.

2. A one piece clamp according to claim 1, wherein said upper and lower portions are semi-circular and said free edges generally face each other.

3. A one piece clamp according to claim 2, wherein said free end of said lower portion is positioned to allow the upper cable to be moved horizontally into the clamp.

4. A one piece clamp according to claim 1, wherein the malleability of said metal is such that the clamp may be tightly closed by a pliers.

5. A one piece clamp according to claim 4, wherein said metal is malleable aluminum.

6. A one piece clamp according to claim 1, wherein said lower portion is semi-circular and said joining portion is reverse curved whereby the clamp has a generally figure eight configuration in end view after the clamp is closed.

7. A one piece clamp according to claim 6, wherein said free end of said lower portion is positioned to allow the upper cable to be moved horizontally into the clamp when the clamp is in its open condition.

8. A one piece clamp according to claim 7, wherein in its open condition said free end of said lower portion does not protrude above the uppermost surface of the lower cable.

9. A one piece clamp according to claim 8, wherein said spaced surfaces on said lower portion for contacting the lower cable are substantially flat.

10. A one piece clamp according to claim 7, wherein the metal is aluminum having a malleability such that the clamp may be tightly closed by a pliers.

* * * * *